Oct. 8, 1929.  C. FIELD  1,730,924
PACKAGE AND MEANS FOR MAKING THE PACKAGE
Original Filed Oct. 7, 1927
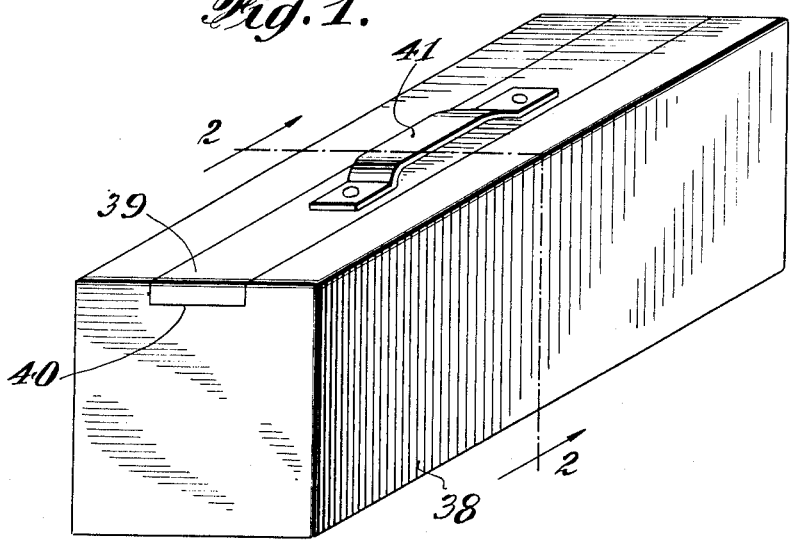
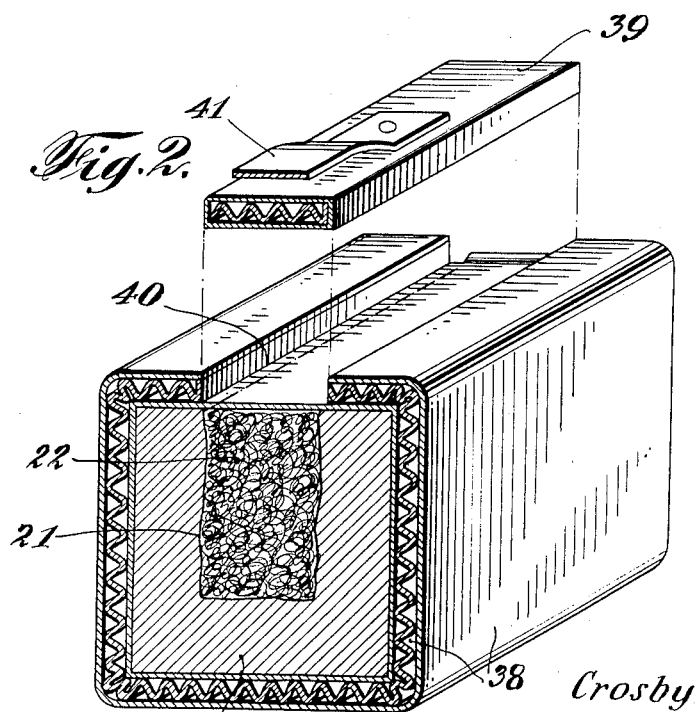
INVENTOR
Crosby Field
BY C. F. Goepel
his ATTORNEY Patented Oct. 8, 1929

1,730,924

UNITED STATES PATENT OFFICE

CROSBY FIELD, OF BROOKLYN, NEW YORK

PACKAGE AND MEANS FOR MAKING THE PACKAGE

Original application filed October 7, 1927, Serial No. 224,541. Divided and this application filed September 20, 1928. Serial No. 307,081.

The present invention relates to a package and means for making the package, particularly adapted for handling ice, and is a division of my prior application, Serial No. 224,541, filed October 7, 1927.

In that application, I have described an article in the form of a package for supplying ice to the consumer for use in the ice box, the ice comprising flake ice or crystals which are carried, housed and protected by the covering of the article or package, and which may be easily and quickly removed with a spoon or other form of dipper for use as desired.

An object of this invention is to provide an ice package which is enclosed in a simple and novel wrapper or covering, which protects the ice, but gives ready access thereto.

With the foregoing and other objects in view, the invention will be more fully described hereinafter, and will be particularly pointed out in the claims appended hereto.

In the drawings, wherein like symbols refer to like or corresponding parts throughout the several views, Figure 1 is a perspective view of a package according to the invention, and Figure 2 is a perspective view in section, taken substantially on the line 2—2 of Figure 1, and showing the closure partly raised from the article.

The article comprises a body 15 of ice which is of the required size and shape. The body 15 may be constructed in any suitable manner, such as by the ordinary freezing of water in containers or the like, or the body 15 may be formed of flake ice mixed with water in a sufficient quantity to fill into the interstices between the flakes, so as to provide a substantially homogeneous mass throughout the whole or a part of the body 15. The frozen body 15 of ice is enclosed in a jacket or wrapper of suitable material which is substantially impervious to moisture, and which may act to some extent as a heat non-conductor so as to preserve the body 15 efficiently during its handling and distribution.

The body 15 of the articles may be frozen inwardly from the bottom and the edges to a predetermined extent to provide a body in the form of a receptacle having a cavity 21 therein which is closed at its ends, extends lengthwise of the article and into which may be placed flake ice 22 packed therein with more or less pressure. The cavity 21 opens through the top of the body 15 so that when the jacket is opened at the top the flake ice may be withdrawn as desired.

This hollow body 15 may be made according to two different methods; the first being the taking of flake ice with water, or crushed ice and water and placing them in an ice can and freezing the mixture inwardly from the sides and bottom for a sufficient length of time to form a bottom and walls of the desired thickness, and with the cavity 21 in the body 15 of the desired depth and opening through the top of the article. This freezing of the mixture holds the body 15 in the desired shape and the thickness of the bottom and walls must be made sufficiently to compensate for melting in storage and use.

The interior of the body 15 is then drained off, and the cavity 21 is then filled with flaked ice or crushed ice. The filled frozen body is then placed in the wrapper or jacket and placed in a cooler for a short time at a temperature of approximately from twenty to twenty-five degrees F. The article is now ready for delivery to the consumer.

The second method of producing the article comprises the taking of flake or crushed ice and compressing it in a suitable press, according to the size of the article to be produced, the press having a die and plunger shaped to provide a body of the desired size and a cavity therein commensurate with the size of the body. The cavity 21 thus formed in the body 15 is filled with flake ice or crushed ice. The body with its contents is then wrapped in the water-proof jacket or covering and treated as described in the first set forth method.

The frozen body or ice cake 15 with its cavity 21 and filling of flake or crushed ice 22, is enclosed in a jacket or wrapper 38 of corrugated or cellular board to more effectively seal the container and prevent the same from damage incident to handling. Here the wrapper or jacket 38 is provided with a removable closure section 39 which is fitted in a slot or opening 40 provided in the top of the wrapper 38 in register with the cavity 21. The removable section 39 may have a handle 41 affixed thereto in any suitable manner, so that the cover 39 may be removed and replaced to maintain the package closed and at the same time permit the casual removal of the flaked or crushed ice from the cavity 21. The cover can be secured, if desired, to the jacket 38 in any suitable fashion.

It will thus be noted that the body or cake of the article is formed of ice shaped to the configuration of a block of standard size with a cavity therein in which loose ice, in flake or crushed form may be conveniently carried and protected and maintained in proper condition for use by the consumer. The cover, wrapper or jacket which encloses the block with its filling may be wholly or only partly removed from the block when the latter is placed in an ice box or chest so as to cool the compartment and admit access to the loose ice.

The construction is such as to admit of various modifications in the shape, size and formation of the surfaces and flues to facilitate access of air to the ice, so that the ice box may be rapidly cooled and effectively maintained at a low temperature.

I have illustrated and described a preferred and satisfactory embodiment of my invention, but it is obvious that changes may be made therein within the spirit and scope thereof as defined in the appended claims.

I claim:—

1. A package of ice comprising a frozen body having a cavity therein opening through the top of the body, a mass of flake ice packed in said cavity, a protecting jacket of cellular board enclosing said body, said jacket having a removable closure section in its top in register with said cavity, and a handle on said closure portion for removing the same at times to permit access to said cavity.

2. A package of ice comprising a frozen body having a cavity therein opening through the top of the body, flake ice in said cavity and a protecting jacket enclosing said body, said jacket having a removable closure section in its top to register with said cavity, and a handle on said closure section to remove same.

3. A package of ice comprising a frozen body having a cavity therein opening through the top of the body, flake ice packed in said cavity, a protecting jacket enclosing said body, said jacket having an opening in its top to register with said cavity, and a removable closure section to be received in said opening.

4. A package of ice comprising a hollow ice block, the cavity of which opens through one face of the block, a waterproof wrapper enveloping the block and including a portion of said wrapper separable from the wrapper in substantial registry with the cavity in said block for exposing the cavity when said portion of the wrapper is removed, and a mass of ice particles packed in said cavity, the cavity and the removable portion of the wrapper being of substantially the same width.

In testimony that I claim the foregoing as my invention, I have signed my name thereto.

CROSBY FIELD.